(12) United States Patent
Sherrill et al.

(10) Patent No.: US 10,878,031 B2
(45) Date of Patent: Dec. 29, 2020

(54) WEB SERVICES-BASED DATA TRANSFERS FOR ITEM MANAGEMENT

(71) Applicant: Walmart Apollo, LLC, Bentonville, AR (US)

(72) Inventors: Ted Sherrill, Centerton, AR (US); Wes Wunschel, Bentonville, AR (US); Venugopal E. Puthalath, Bentonville, AR (US); Guillermo Thompson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 202 days.

(21) Appl. No.: 15/956,362

(22) Filed: Apr. 18, 2018

(65) Prior Publication Data

US 2018/0338002 A1 Nov. 22, 2018

Related U.S. Application Data

(60) Provisional application No. 62/507,159, filed on May 16, 2017.

(51) Int. Cl.
*G06F 16/80* (2019.01)
*G06F 16/84* (2019.01)
*G06F 16/957* (2019.01)

(52) U.S. Cl.
CPC ............. *G06F 16/88* (2019.01); *G06F 16/80* (2019.01); *G06F 16/84* (2019.01); *G06F 16/9577* (2019.01)

(58) Field of Classification Search
CPC ..... H04L 67/12; H04L 67/02; H04L 67/1097; H04L 63/123; G06F 9/546; G06F 9/548;
(Continued)

(56) References Cited

U.S. PATENT DOCUMENTS 5,329,619 A 7/1994 Page et al.
5,878,220 A 3/1999 Olkin et al.
(Continued)

OTHER PUBLICATIONS

Nadhan et al., "A Strategic Approach to Data Transfer Methods", https://msdn.microsoft.com/enus/library/aa480064.aspx, Oct. 2004, 15 pages.

*Primary Examiner* — Usmaan Saeed
*Assistant Examiner* — Jessica N Le (57) ABSTRACT

A system and method is provided for a web services-based data transfers. A data power component translates a service request in a first format received from a first computing device into a translated service request in a second format compatible with a web service. The translated service request includes converted freight data associated with a set of items structured for storage within one or more database(s) associated with a second computing device. The translated service request is a request to load the freight data onto the database(s). The translated service request is transmitted to the web service. In response, the data power component receives a response from the web service indicating whether the freight data is successfully loaded onto the database(s). The data power component translates the response from the second format into the first format. The translated response is returned to the first computing device.

20 Claims, 7 Drawing Sheets

(58) Field of Classification Search
CPC .......... G06F 21/00; G06F 16/80; G06F 16/84;
G06F 16/88; G06F 16/9577; G06Q
10/083
USPC .......................................................... 707/703
See application file for complete search history.

(56) References Cited

U.S. PATENT DOCUMENTS

| | | | |
|---|---|---|---|
| 7,502,754 B2* | 3/2009 | Campbell | G06Q 30/04 380/255 |
| 8,090,596 B2 | 1/2012 | Maresh et al. | |
| 8,312,150 B2 | 11/2012 | Clark et al. | |
| 8,782,101 B1 | 7/2014 | Moore | |
| 2004/0199285 A1* | 10/2004 | Berichon | G06F 16/9554 700/225 |
| 2005/0066002 A1 | 3/2005 | Teres et al. | |
| 2013/0151655 A1* | 6/2013 | Wu | H04L 67/2823 709/217 |
| 2014/0279660 A1* | 9/2014 | Santavicca | G06Q 10/083 705/337 |
| 2014/0280494 A1* | 9/2014 | Samoylenko | H04L 67/10 709/203 |
| 2014/0365393 A1* | 12/2014 | Taylor | G06Q 10/08345 705/335 |
| 2015/0074670 A1* | 3/2015 | Gerganov | G06F 9/5027 718/103 |
| 2016/0188386 A1* | 6/2016 | Lisi | G06F 9/541 719/328 |
| 2016/0294953 A1* | 10/2016 | Prabhakar | H04L 67/142 |
| 2017/0048339 A1* | 2/2017 | Straub | G06F 8/71 |
| 2017/0220399 A1* | 8/2017 | Raghavan | G06F 16/116 |
| 2018/0137184 A1* | 5/2018 | Adamut | G06F 16/258 |

\* cited by examiner

DATA TRANSFER SYSTEM ARCHITECTURE 200

| CLIENT LAYER 202 | PRESENTATION LAYER 204 | JCICS SERVICE LAYER 206 | MAINFRAME LAYER 208 |
|---|---|---|---|
| • CLIENT DEVICE(S) | • APPLICATION SERVER(S) | • WEB SERVICE(S) | • SET OF DATABASE TABLE(S) |

WEB SERVICES-BASED DATA TRANSFERS FOR ITEM MANAGEMENT

BACKGROUND

Freight management systems gather, process and store information associated with items received by a store or other purchaser from a manufacturer or other supplier of goods. For examples, freight management systems may manage payments to the manufacturer or supplier for items received by one or more stores. A freight management system may also process requests from stores to the manufacturer for the return or refund of defective or recalled items received from the manufacturer or supplier.

Current freight management systems typically reside on a physical freight management server. This freight management server communicates with applications running on one or more store computing systems to obtain item payment data and/or item return data received items. This freight management server also communicates with one or more other backend mainframe devices associated with database storage systems to store and/or retrieve freight payment and/or item return data. The current freight management system servers are middleware devices consuming network bandwidth and hardware resources. Moreover, the freight management servers require physical space occupied by the device as well as additional expense for purchase and maintenance of the physical server. This system is inefficient and cumbersome.

SUMMARY

Some examples of the disclosure provide a computer-implemented method for web services-based data transfers. A freight management service request in a simple object access protocol (SOAP) format is received from a first computing device. The freight management service request includes freight data associated with a set of items. A data power component translates the freight management service request from the SOAP format into a JAVA script object notation (JSON) format compatible with a web service associated with a second computing device. The translated service request includes converted freight data structured for storage within at least one database associated with the second computing device. The translated service request is transmitted, via a network, through a customer information control system (CICS) component associated with the second computing device. The web service loads the freight data onto the at least one database.

Other examples of the disclosure provide a computing system for web service-based data transfers. The computing system includes a memory device storing a data power component and computer-executable instructions. The system also includes a processor. The processor executes the computer-executable instructions to receive a freight management service request in a first format from a client computing device. The freight management service request includes freight data to be loaded onto a set of databases associated with a mainframe computing device. A data power component translates the freight management service request from the first format into a second format compatible with a representational state transfer (REST) web service associated with a JAVA customer information control system (JCICS) region of the mainframe computing device. The translated freight management service request includes data structured for storage within the set of databases. The processor further executes the computer-executable instructions to transmit the translated freight management service request to the mainframe computing device. A response message is received from the mainframe indicating whether loading of the freight data is complete.

Still other examples provide one or more computer storage media embodied with computer-executable instructions. The one or more computer storage media includes a data power component. The data power component is executed by at least one processor to receive a service request. The service request includes freight data in a SOAP format from a client computing device. The data power component is further executed by the at least one processor to convert the service request from the SOAP format into a JSON format that is compatible with at least one database on a mainframe computing device. The data power component is further executed by the at least one processor to transmit the translated request to a JCSIS component on the mainframe via a web service. In response to a failure to receive a response within a threshold time, the translated request is resent to the mainframe by the data power component. When a response is received from the web service, the data power component translates the response from the JSON format into the SOAP format and returns the translated response to the client computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable web services-based data transfers for management of retail items and/or product returns. In some examples, a data power component is provided for performing service request translations and data transfers between client devices and a database server. The data power component enables two-way data transmission between a client device and a mainframe utilizing web services to eliminate a central hardware server with a message queue manager service on the mainframe. This enables fail over for improved data transfer reliability and reduced error rate.

The data power component running on a cloud platform translates a web service request generated by a client in a first format into a translated web service request compatible with the database server. This enables data transfer between a first computing device and a second computing device using different data formats using web services without an intermediary physical server between the first and second computing devices. This provides a simplified data transfer design for consolidated data transmission and reduces network traffic and network bandwidth usage.

In other examples, a data power component is provided as a web service via a cloud server. This provides a simplified data transfer architecture enabling efficient data flow from one or more client devices to a mainframe computing device via web services. The web services data power component enables faster communication between devices and reduced processor load on the one or more client devices and mainframe.

A representational state transfer (REST) web service in some examples loads the translated freight data received from one or more client devices onto a backend DB2 database with normalized tables. This enables improved data management while reducing costs associated with the management of freight data.

The data power component in other examples receives a response in JSON format from the web services indicating whether the freight data is successfully loaded onto a database in accordance with the client service request. The data power component translates the response from the JSON format into a simple object access protocol (SOAP) format that is compatible with the client computing device that created the client service request. The data power component sends the translated response to the client computing device for output via a user interface (UI). This enables improved user-friendly interface with increased flexibility and usability to improve user efficiency via UI interaction.

Figure 1:
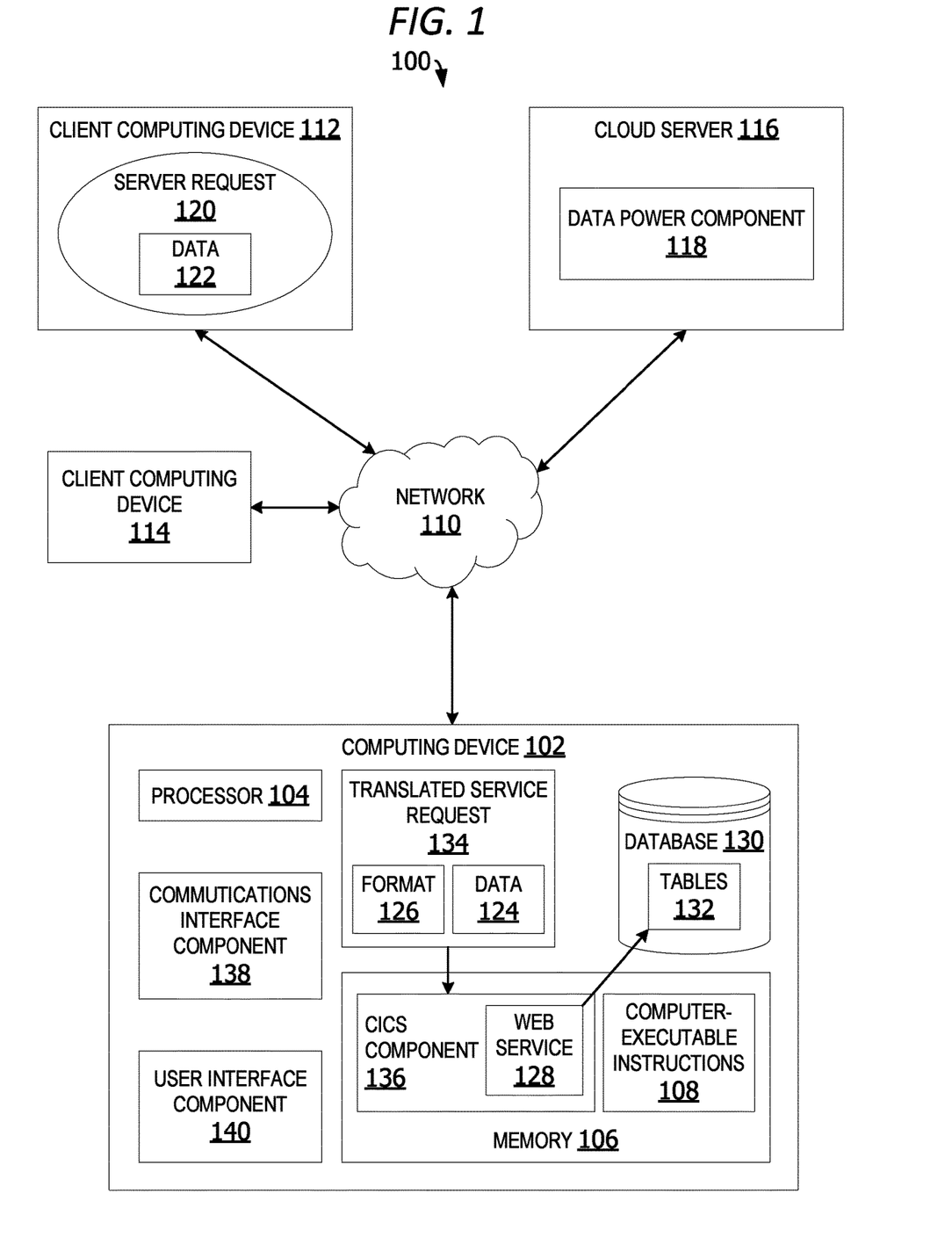
FIG. 1 is an exemplary block diagram illustrating a system for web services-based data transfers.

Referring again to FIG. 1, an exemplary block diagram illustrates a system 100 for web services-based data transfers. In the example of FIG. 1, the computing device 102 represents any device executing instructions (e.g., as application programs, operating system functionality, or both) to implement the operations and functionality associated with the computing device 102. The computing device 102 may include any type of server, desktop personal computers, kiosks, or tabletop devices. Additionally, the computing device 102 may represent a group of processing units or other computing devices. In this example, the computing device is a mainframe computer.

In some examples, the computing device 102 has at least one processor 104 and a memory 106. The processor 104 includes any quantity of processing units, and is programmed to execute computer-executable instructions 108. The computer-executable instructions 108 may be performed by the processor 104 or by multiple processors within the computing device 102, or performed by a processor external to the computing device 102. In some examples, the processor 104 is programmed to execute instructions such as those illustrated in the figures (e.g., FIGS. 6 and 7).

In some examples, the processor 104 represents an implementation of analog techniques to perform the operations described herein. For example, the operations may be performed by an analog computing device and/or a digital computing device.

The computing device further has one or more computer readable media, such as, the memory 106. The memory 106 includes any quantity of media associated with or accessible by the computing device 102. The memory 106 may be internal to the computing device (as shown in FIG. 1), external to the computing device (not shown), or both (not shown). In some examples, the memory 106 includes read-only memory and/or memory wired into an analog computing device.

The memory 106 stores data, such as one or more applications. The applications, when executed by the processor 104, operate to perform functionality on the computing device 102. The applications may communicate with counterpart applications or services such as web services accessible via a network 110.

The network 110 may be any type of network for permitting one device to communicate with another device. The network 110 may be implemented as a local area network (LAN) or a wide area network (WAN), such as the Internet. The LAN may include a wired LAN or a wireless LAN. A wireless LAN may be implemented using Ethernet, Wi-Fi or any other type of LAN. The LAN in some examples utilizes a BLUETOOTH communications protocol, NFC technology, or any other type of technology for implementing a LAN. As used herein, a LAN may include a personal area network (PAN), a campus area network (CAN), or any other type of localized network.

In this non-limiting example, the network 110 is implemented as the Internet. The network 110 connects the computing device to one or more other computing devices, such as the client computing device 112 and the client computing device 114.

The client computing device 112 represents any device executing instructions to implement the operations and functionality associated with the client computing device. The client computing device 112 may include a mobile computing device or any other portable device. In some examples, the client computing device 112 includes a mobile telephone, laptop, tablet, computing pad, netbook, gaming device, and/or portable media player. The client computing device 112 may also include less portable devices, such as desktop personal computers, kiosks, tabletop devices, or industrial control devices.

The system 100 in other examples includes one or more cloud servers, such as, the cloud server 116. The cloud server 116 is a virtual server executing within a cloud. In other words, the cloud server 116 is hosted and provided by a cloud computing platform. The cloud server is implemented via one or more hardware server(s) 608 or one or more physical data storage devices, such as, but not limited to, the computing device 102.

In this example, the cloud server 116 includes a data power component 118. The data power component 118 is a service implemented as a component. The data power component 118 enables direct communication between the client computing device and the mainframe via the web.

In some examples, the data power component 118 receives a service request 120 in a first format from one or more client computing devices, such as, but not limited to, the client computing devices 112 and 114. In this example, the data power component 118 receives the service request 120 from the client computing device 112.

The service request in some examples is a freight management service request. The first format of the service request in some examples is a SOAP. The service request 120 includes data 122 associated with a set of items. In this example, the data 122 is freight data. The freight data is data associated with a set of items received from a distribution center, such as, but not limited to, inventory data for the set of items, payment data for the set of items, return data for the set of items, or other data associated with a set of items. In some examples, the data 122 includes freight payment data. In other examples, the data 122 includes warehouse return data.

Warehouse return data includes data associated with notifications from a recipient to a supplier that an item is identified as not sellable and/or to be disposed of in accordance with appropriate terms and conditions of a vendor return agreement. Items may be considered "not sellable" if the item is defective, damaged, or overstocked.

The data power component 118 is further executed by at least one processor associated with the cloud server 116 to translate the service request from the first format into a translated service request 134 in a second format 126 compatible with a web service associated with the computing device 102. In some examples, the second format 126 is a JSON format. In other examples, the service request 120 is written in extensible markup language (XML) and the translated service request 134 is written in a JAVA programming language.

The data power component 118 in other examples converts the freight data into a structure that is compatible with a data storage associated with the computing device 102. The data storage in this example includes database 130.

In this non-limiting example, the database 130 is stored on a data storage device. A data storage device may be implemented as one or more spinning magnetic disks or solid state drives, such as, for example, one or more hard disks and/or one or more flash drives. A data storage device in other examples may include a redundant array of independent disks (RAID) array. In still other examples, the data storage device includes one or more cloud storage on a public or private cloud accessible via the network 110.

The data power component 118 is further executed by at least one processor associated with the cloud server 116 to transmit the translated service request 134 through a customer information control system (CICS) component 136 associated with the computing device 102. In other examples, the CICS component 136 is a JAVA customer information control system (JCICS) region associated with computing device 102.

The data power component 118 in some examples transmits the translated service request through a web service 128 associated with the CICS component. The web service 128 in some examples is a service or application provided to clients via the network 110, such as the Internet.

In this example, the client computing device 112 invokes the web service 128 by sending an XML message, such as service request 120 via the network 110. The client computing device 112 transfers the data 122 via SOAP. A web-based description language (WSDL) is utilized by the web service provider to describe the available web services. A universal description, discovery and integration (UDDI) XML based registry is utilized in some examples to list available web services to the client computing device 112.

The web service 128 in some examples extracts the converted data 124 from the translated service request 134. The web service 128 loads the converted data 124 onto the one or more database tables 132 associated with the database 130. The converted data 124 associated with the translated service request 134 in other examples includes converted freight data structured for storage within the database 130.

The web service 128 in this non-limiting example is a REST web service. The REST web service sends and receives data via a REST application programming interface (API).

In this example, the web service 128 is a REST web services with JAVA database connectivity (JDBC) connections deployed in mainframe CICS regions, such as CICS component 136 in computing device 102. In other examples, the web service 128 is a software-as-a-service (SaaS) provided by a cloud server associated with a cloud platform, such as the cloud server 116.

In the example shown in FIG. 1, the web service 128 loads the freight data onto the database 130. In other examples, a first web service running on the cloud server 116 translates the service request and/or sends the translated service request to the computing device 102. A second web service loads the freight data onto the database 130.

In some examples, the computing device 102 includes a communications interface component 138. The communications interface component 138 includes a network interface card and/or computer-executable instructions (e.g., a driver) for operating the network interface card. Communication between the computing device 102 and other devices may occur using any protocol or mechanism over any wired or wireless connection. In some examples, the communications interface component 138 is operable with short range communication technologies such as by using near-field communication (NFC) tags.

In other examples, the computing device 102 includes a user interface component 140. The user interface component 140 optionally includes a graphics card for displaying data to the user and receiving data from the user. The user interface component 140 may also include computer-executable instructions (e.g., a driver) for operating the graphics card. Further, the user interface component 140 may also include a display (e.g., a touch screen display or natural user interface) and/or computer-executable instructions (e.g., a driver) for operating the display. The user interface component 140 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

In the example shown in FIG. 1, the data power component is implemented on a cloud server. In other examples, the data power component is implemented as a web service on a client-side system associated with a retail store, such as, the client computing device 112.

Figure 2:
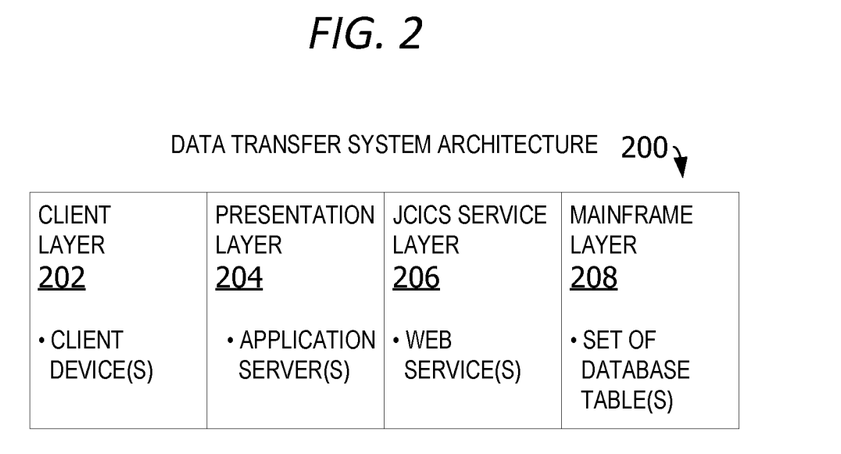
FIG. 2 is an exemplary block diagram illustrating a data transfer system architecture.

FIG. 2 is an exemplary block diagram illustrating a data transfer system architecture 200. The data transfer system architecture 200 includes a client layer 202, a presentation layer 204, a JCICS service layer 206, and a mainframe layer 208. The client layer 202 includes one or more client computing devices generating one or more service requests to invoke JCICS web services.

The presentation layer 204 includes at least one application server. The application server(s) host one or more applications for invoking one or more web services, such as, but not limited to, the cloud server 116 in FIG. 1. In some examples, the application server(s) execute a data power component for translating service requests generated by clients at the client layer 202 into translated service requests compatible with the JCICS service layer 206.

The JCICS service layer 206 in some examples includes one or more web service(s). In this example, the JCICS service layer includes a REST web service for loading freight data onto a set of databases associated with a mainframe layer 208.

The mainframe layer 208 in some examples includes a set of database tables. The set of database tables are associated with a set of one or more databases, such as, but not limited to, the database 130 in FIG. 1. In this example, the set of databases includes a relational database, such as, but not limited to, a DB2 database.

Figure 3:
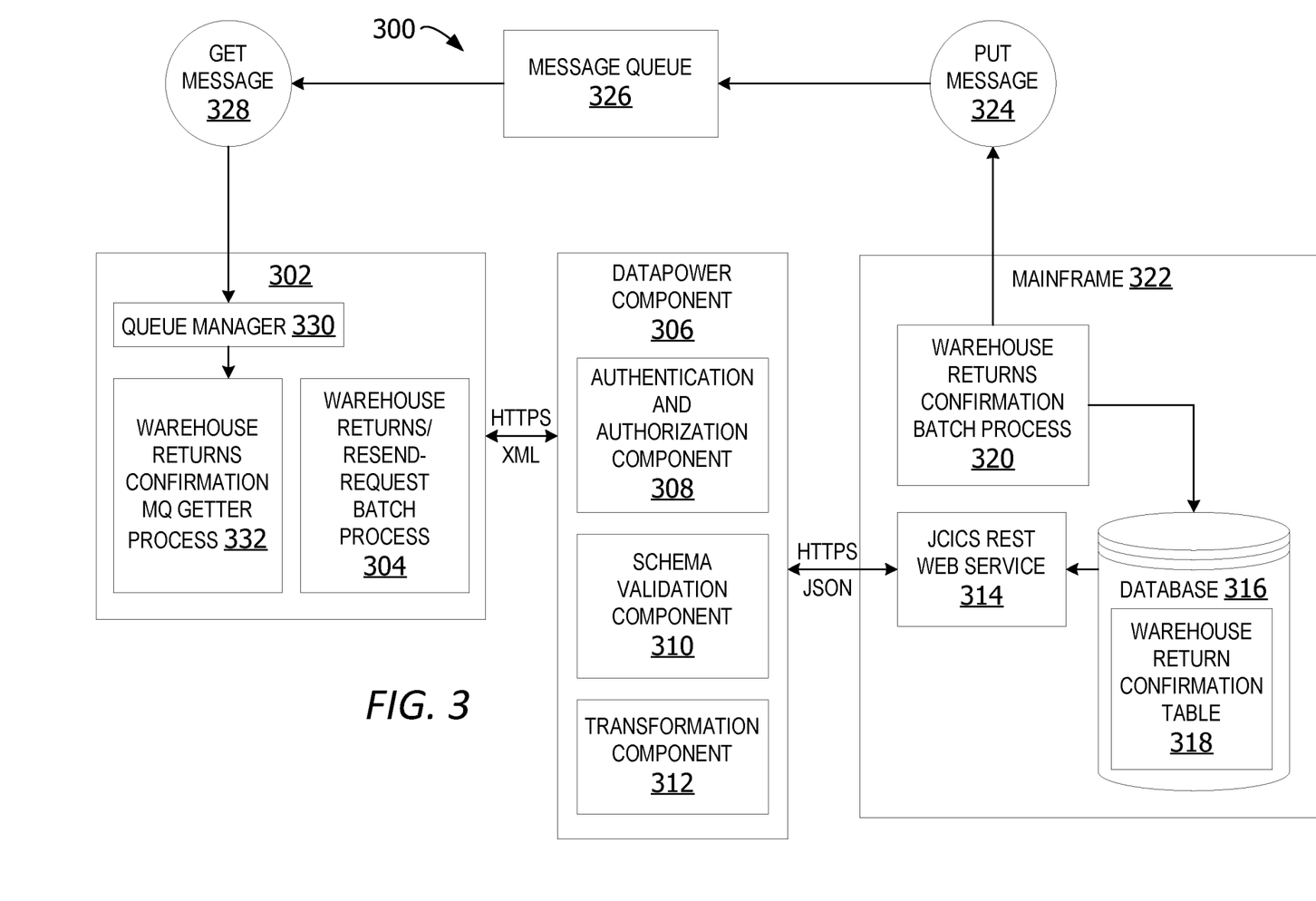
FIG. 3 is an exemplary block diagram illustrating a warehouse return confirmations process via a data power component.

FIG. 3 is an exemplary block diagram illustrating a warehouse return confirmations process via a data power component. In this example, the freight management system 300 includes a client computing device 302. The client computing device 302 executes a warehouse return/re-send request batch process 304.

The warehouse return/re-send request batch process 304 in some examples generates a freight management service request in XML. The freight management service request is transmitted to a data power component 306 via a hypertext transfer protocol (HTTPS) via a network, such as the network 110 in FIG. 1.

The data power component 306 is a component for converting a service request into a web services compatible format. In this example, the data power component 306 is resident on a cloud server, such as cloud server 116 in FIG. 1. In other examples, the data power component 306 is implemented on a computing device, such as the computing device 102 or the client computing device 112 in FIG. 1.

The freight management service request includes freight data. The freight data is data associated with one or more items received by a distribution center, store, retail establishment, or customer. The freight data in this non-limiting example includes warehouse return data associated with one or more items from a store or retail establishment to be returned to a warehouse or distribution center.

The data power component 306 performs an authentication and authorization component 308 on the freight management service request. In some examples, a user name and password in security headers of SOAP service requests are validated using lightweight directory access protocol (LDAP).

In one example, the data power component 306 decodes the SOAP service request security header-base 64 password and rewrites with its encoded value. The authentication and authorization component 308 validates the security header username and password using LDAP. The authentication and authorization component 308 performs authorization by checking whether the username is present in the LDAP group.

If the freight management service request is authenticated and authorized, a schema validation component 310 determines whether the service request conforms to a given schema. In some examples, the schema validation component 310 determines whether the request conforms to an XML schema. However, the examples are not limited to an XML schema. In other examples, the schema validation component 310 determines whether the service request conforms to a database schema associated with a database, such as database 316.

If the service request is validated by both the schema validation component 310 and the authentication and authorization component 308, a transformation component 312 transforms the service request from a first format compatible with the client computing device 302 into a second format compatible with a web service associated with the mainframe database, such as the JCICS REST web service 314 associated with mainframe 322 and/or database 316.

In some examples, when the service request is validated by the authentication and authorization component 308, the data power component 306 converts the SOAP request to JSON as XML (JSONX), validates the application ID and consumer ID, stores the service request information in context variables which are used later for logging via an external logging tool. Any service requests with improper application ID and consumer ID are rejected. The data power component 306 converts the JSONX to JSON to generate the translated service request. In some examples, the data power component 306 routes the translated service request to a CICS web service based on the application ID, consumer ID, and/or country code.

In this example, the transformation component 312 transforms the service request from a SOAP format into a JSON format. In other examples, the transformation component 312 further converts data associated with the service request into a structure which is compatible with the database 316. For example, the transformation component 312 may convert the freight data within the freight management service request into a structure capable of being loaded and stored on the database 316.

In some examples, the transformation component 312 queries the database 316 for data associated with the structure and/or format required for converting the request into a compatible format. In other words, the transformation component 312 queries the database for compatibility information. In other examples, the transformation component 312 includes the compatibility information for one or more databases, such as database 316. The compatibility information may be provided to the data power component during an initialization phase when the data power component 306 is first initialized on the system.

How does the component know the structures capable of being loaded and stored on the database? Does it query the database or otherwise have that info?

The data power component 306 transmits the translated service request through a JCICS component on a mainframe 322 to a JCICS REST web service 314. The mainframe 322 is a computing device, such as the computing device 102 in FIG. 1. The web service is a cloud service, such as, but not limited to, the web service 128 in FIG. 1.

In this example, the JCICS REST web service 314 is a JAVA based web service implemented on a CICS Liberty Server. The CICS Liberty Server is a back-end server associated with one or more databases. However, the examples are not limited to implemented on a CICS Liberty Server. The JCICS REST web service 314 may be provided via a database server, SaaS server, CICS transaction server, a cloud server, a mainframe computing device, or any other type of computing device for providing a web services for loading data onto a database.

The data power component 306 in some examples transfers the translated service request to a JCICS REST web service based upon a country code, consumer identifier (ID), and/or application ID associated with the service request. Upon receiving the service request, the JCICS REST web service 314 extracts the freight data from the translated service request. The JCICS REST web service 314 loads the freight data onto the database 316.

In this example, the JCICS REST web service 314 extracts warehouse return data from the freight management service request. The JCICS REST web service 314 loads the extracted warehouse return data onto a warehouse return confirmation table 318 on the database 316.

In still other examples, the JCICS REST web service loads the warehouse return data onto the warehouse return confirmation table via a row-by-row insertion via a load freight data operation. In this example, a response acknowledging upload of data to the database 316 is sent to the client computing device 302 as warehouse return data is added to each row of the warehouse return confirmation table 318. The load freight data operation does not load a record again if it is a duplicate. In other words, duplicate data is not loaded into the database. In other examples, after loading the freight data, a response of each record is sent back to the client computing device.

In this example, freight data is loaded onto a warehouse return confirmation table 318. However, the examples are not limited to loading freight data onto a warehouse return confirmation table. In other examples, freight data may be loaded onto a freight payment (FREIGHT_PAYMENT) table, or any other type of database table for loading freight data. These separate database log tables enable maintenance of disparate type of history data with an improved purging mechanism.

In some examples, a warehouse returns confirmation batch process 320 to put a message 324 to a message queue (MQ) 326. The message 324 includes an acknowledge message or an error message associated with a portion of the freight data extracted from the freight management service request. An acknowledge message indicates at least a portion of the freight data is successfully loaded to the database 316 or other data storage device. An error message indicates loading of at least a portion of the freight data to the database 316 or other data storage device failed.

A queue manager 330 connects the mainframe 322 with the client computing device 302. The queue manager 330 in some examples periodically checks the MQ 326 for the acknowledgement message or the error message corresponding to the freight management service request. The queue manager 330 sends a request to the queue and receives a message 328 in response.

The retrieval of an acknowledgement message or an error message from the MQ 326 by the queue manager 330 triggers a warehouse returns confirmation MQ getter process 332 in some examples. The warehouse returns confirmation MQ getter process 332 triggers re-sending of the freight management service request in response to receiving an error message indicating the data is not loaded.

The warehouse returns confirmation MQ getter process 332 in other examples outputs a confirmation to an output device for presentation to a user in response to receiving an acknowledgement indicating successful loading of the freight data to the database 316. In this manner, the system allows a re-send request for un-confirmed warehouse returns from store to mainframe.

In some examples, the queue manager 330 includes an MQ getter module. The mainframe 322 in these examples includes an MQ Putter module. The MQ messages placed on the MQ 326 may be utilized to consolidate warehouse address data, relocation data, and other item-related data. This enables improved security, enhanced logging mechanisms, and more accurate monitoring of data loading onto the database 316.

In the non-limiting example shown in FIG. 3, the client computing device 302 is a device associated with a retail store and the mainframe 322 is a back-end computing device associated with a database. The mainframe 322 receives and/or stores data from one or more retail stores. The freight management system 300 enables a MQ flow from the mainframe 322 to the one or more client devices associated with one or more retail stores.

In the example shown in FIG. 3, a service request is re-sent in response to receiving an error message indicating that at least a portion of the freight data was not successfully loaded onto the one or more databases. In other examples, if the data power component fails to receive a response from the web service within a threshold time, the data power component resends the translated service request to the web service. The threshold time is a user defined time or a default period of time.

The threshold time may include any user selectable amount of time, such as, but without limitation, ten seconds (10 sec), five minutes (5 min), one hour (1 hr.), twenty-four hours (24 hrs.), or any other time period. In one non-limiting example, the threshold time may be one minute. If a response is not received within the one minute threshold time period after sending the translated service request, the data power component re-sends the translated service request to the web service.

In the example shown in FIG. 3, the authentication and authorization component 308 is implemented on a cloud server. In other examples, the authentication and authorization component 308 is implemented on a client-side computing device associated with a store, such as client computing device 302.

Figure 4:
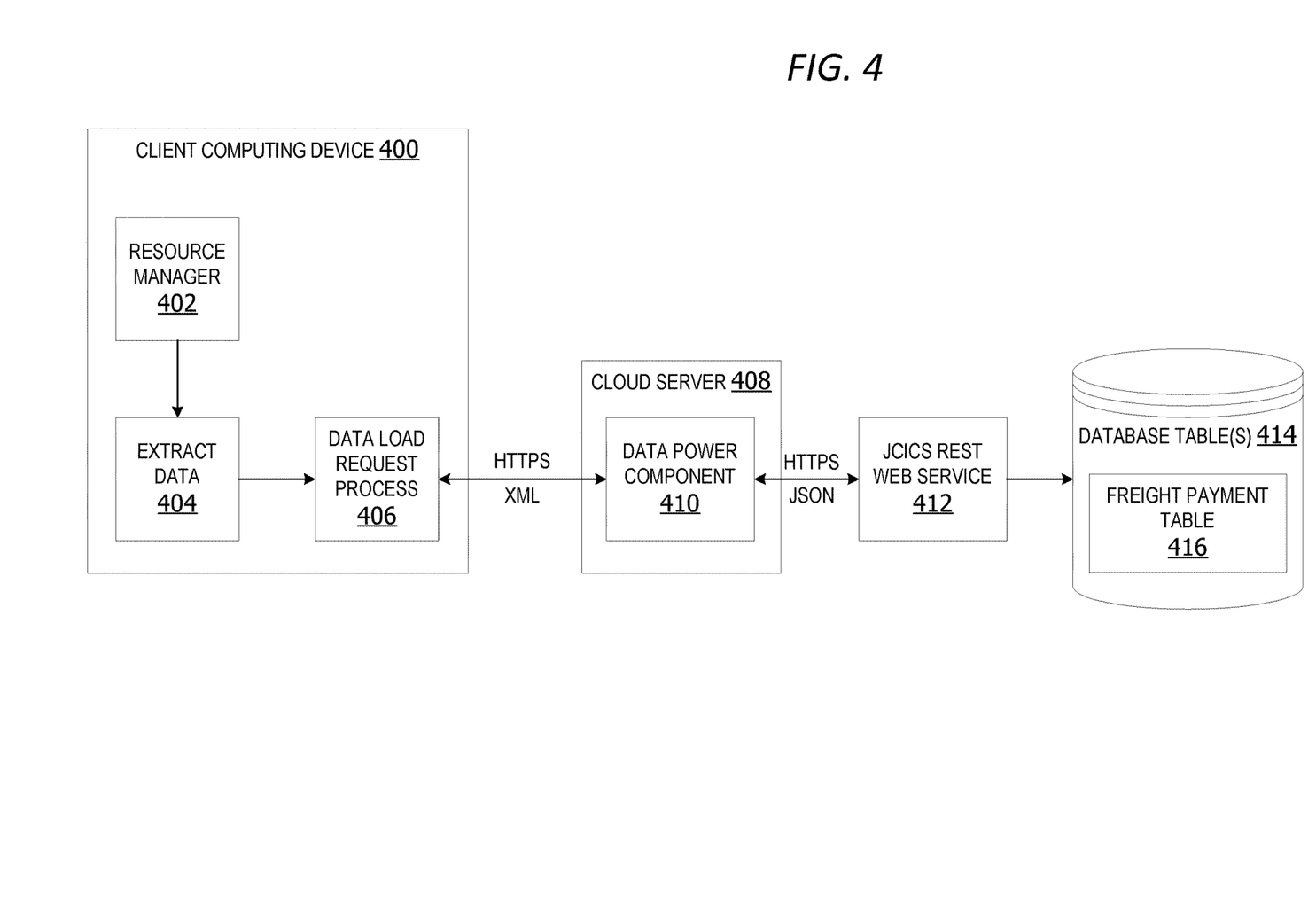
FIG. 4 is an exemplary block diagram illustrating a freight payment process via a data power component.

FIG. 4 is an exemplary block diagram illustrating a freight payment process via a data power component. A freight payment system in some examples processes freight payments for items inbound to stores and/or received by customers, distribution centers, retail stores, or other recipient of goods from a manufacturer.

In this example, the client computing device 400 includes a resource manager 402. A user associated with the client computing device 400 invokes the freight payment service from the client computing device 400 to create a SOAP service request.

In some examples, a resource manager 402 receives data input from the user and/or the resource manager 402 extracts data 404, such as freight payment data, from one or more data sources for obtaining freight data. A data source for obtaining freight data may include, for example, receiving document files, freight payment confirmation files, customer return forms, invoices, payment records, shipping records, delivery records, etc.

A data load request process 406 executing on at least one processor of the client computing device 400 generates a service request using the data 404. In this example, the service request is a request for a web service to load freight data to at least one database, such as the database 130 in FIG. 1.

The service request, in some examples, is transmitted in XML to a cloud server 408 using HTTPS via a network, such as the network 110 in FIG. 1. The cloud server 408 is a virtual server running on a cloud platform, such as cloud server 116 in FIG. 1. In some examples, the service request is received by a physical load balancer associated with the client device. In some examples, a client side secure socket layer (SSL) profile used in HTTPS front side handler for making secure connection between the load balancer and the data power component.

In some examples, the system includes a plurality of data power component. Each data power component in the plurality of data power components corresponds to a particular data power component. In these examples, a received service request is routed to a load balancer. Upon reaching the load balancer, the load balancer routes the service request to a selected data power component in a plurality of data power components, such as, data power component 410. The load balancer, in some examples, routes the request to a given data power component based on a format of the request, a destination of the request, and/or address information in a header of the service request.

The data power component 410 associated with the cloud server 408 translates the service request from a first format compatible with the client computing device 400 into a second format compatible with the JCICS REST web service 412. In this example, the web service request is translated from a first SOAP format into a second JSON format. The data power component 410 sends the translated service request through the JCICS REST web service 412. The JCICS REST web service 412 extracts freight data from the service request.

The JCICS REST web service in some examples is a freight payment web service in JCICS region of the mainframe. The JCICS REST web service loads the extracted freight data onto the one or more database tables 414. In this example, the one or more database tables 414 reside on a data storage device associated with a computing device, such as the computing device 102 in FIG. 1 or the mainframe 322 in FIG. 3.

In some non-limiting examples, the freight data includes freight payment data. The JCICS REST web service extracts the freight payment data from the service request. The JCICS REST web service loads the freight payment data into a freight payment table 416. The JCICS REST web service 412 updates the freight payment table 416 in real-time.

In this example, freight data is loaded onto a freight payment table 416. However, the examples are not limited to loading freight data onto freight payment tables. In other examples, freight data may be loaded onto a warehouse return confirmation table, or any other type of database table for loading freight data.

The JCICS REST web service in some examples sends a response to a UI associated with the client computing device 400. In some examples, the UI is a SOAP UI. The response indicates whether the freight data is successfully loaded onto the database tables. If the freight data is successfully loaded, an acknowledge response message is sent. If at least a portion of the freight data fails to load onto the database tables, an error message is sent to the client for presentation to a user.

In the example shown in FIG. 4, the data power component executes on a cloud server. In other examples, the data power component executes on a physical computing device.

Figure 5:
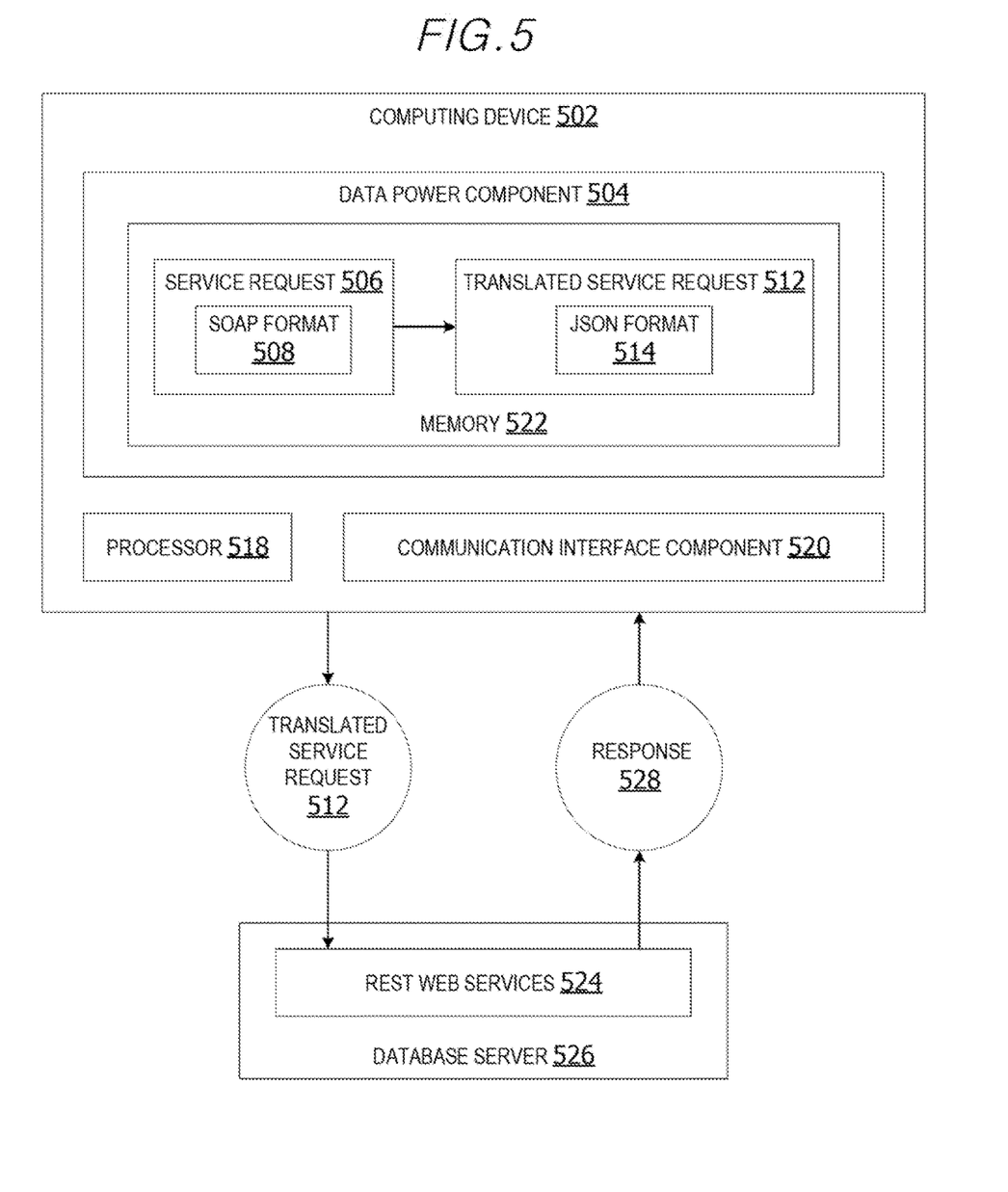
FIG. 5 is an exemplary block diagram illustrating a computing device executing a data power component for performing data transfers.

FIG. 5 is an exemplary block diagram illustrating a computing device including a data power component for performing data transfers. A computing device 502 includes a memory 522 storing the data power component 504. At least one processor 518 executes the data power component 504 to translate a service request 506 in a SOAP format 508 into a translated service request 512 in a JSON format 514.

A communications interface component 520 outputs the translated service request 512 to a REST web services 524 running on a server, such as a database 526. In other examples, the server may be implemented as an applications server, a mainframe computing device, or any other type of computing device.

The REST web services 524 loads the freight data onto a database. The REST web services 524 returns a response 528 to the data power component 504. The response 528 indicates whether the converted freight data was loaded onto the database.

The data power component 504 receives the response 528 in a JSON format 532. The data power component 504 translates the response 528 from the JSON format 532 into a translated response 534 in a SOAP format 536. In some examples, the data power component 504 converts the JSON format to JSONX. The data power component 504 then converts the JSONX to a translated SOAP response.

The translated response 534 is compatible with the client computing device that generated the original service request 506. In some examples, the computing device 502 is the client computing device that generated the original service request 506. In other examples, a remote computing device is the client computing device that generated the original service request 506. In these examples, the computing device 502 transmits the translated response to the remote computing device via a network connection. In this manner, the data power component enables exchange of information between the client device and mainframe without any dependency or reliance on a physical server.

The REST web services 524 in some examples sends the JSON response 528 to the data power component 504. The data power component 504 converts the JSON response 528 to a SOAP response. The translated SOAP response is returned to the client device. The client device validates the translated response and outputs the response to a consumer, retail store associated, or other user.

The data power component 504 in some examples stores error codes and error text in context variables for later use in logging via an external logging tool. During external logging tool logging, the data power component 504 retrieves the service request information, such as service number (SvcNm), preferred language (PrefLanguage), consumer ID (Cnsmrid), application ID (AppId), version, country code, and store number from the context variables. Similarly, the data power component 504 retrieves the response information, such as error code and error text, from the context variables. The data power component 504 logs response information to the external logging tool. In this manner, the external logging tool may handle data power error data during SOAP fault and transaction.

Figure 6:
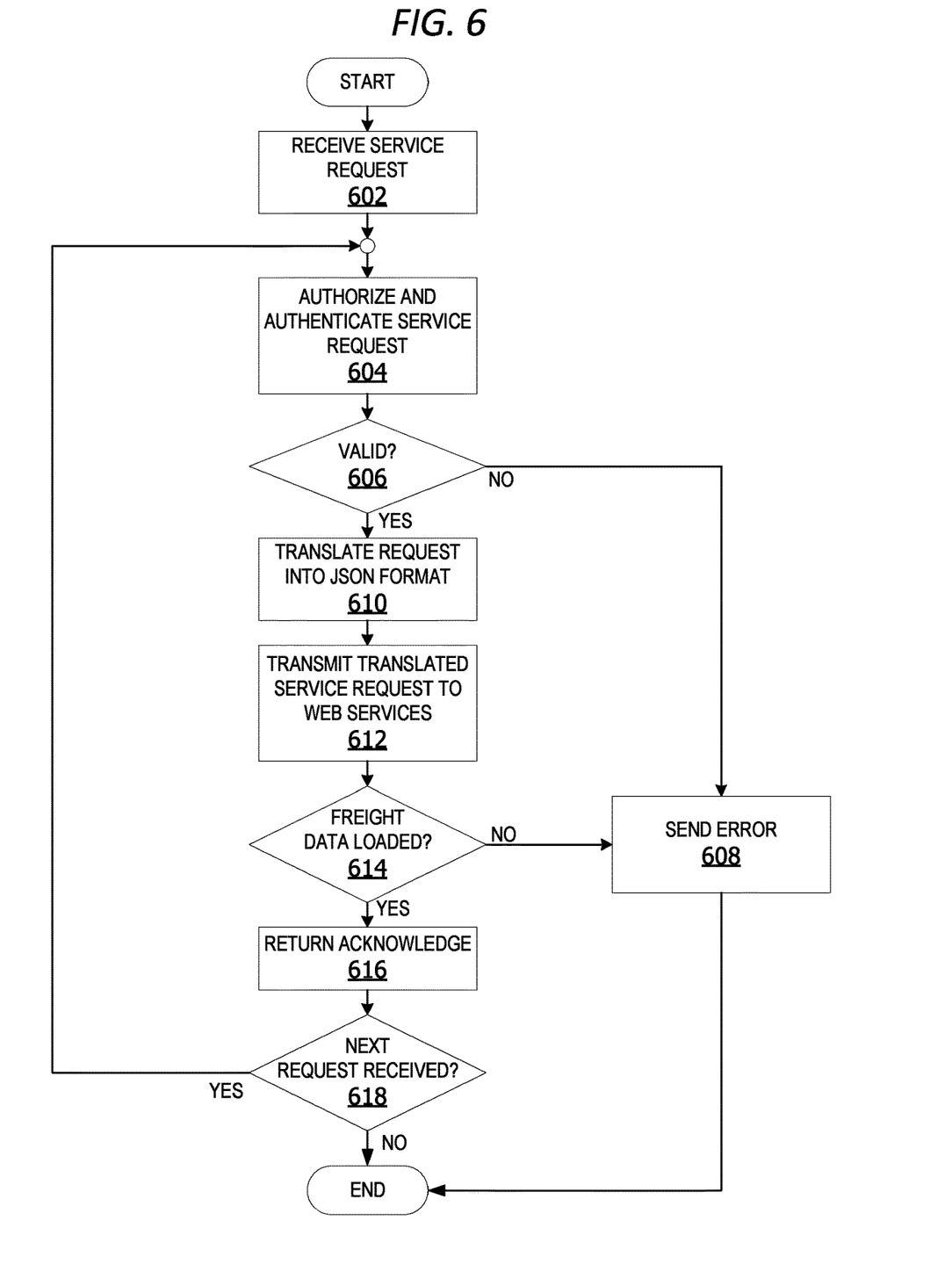
FIG. 6 is an exemplary flow chart illustrating operation of the computing device to translate a service request via a data power component.

FIG. 6 is an exemplary flow chart illustrating operation of the computing device to translate a service request via a data power component. The process shown in FIG. 6 may be performed by a data power component executing on a cloud platform, such as the cloud server 116 in FIG. 1. In other examples, the data power component is executed on a computing device, such as, but not limited to, the computing device 102, 112, or 114 in FIG. 1.

The process begins by receiving a service request at operation 602. The service request is a request to invoke a web service. In this example, the service request is a request for a service to load freight data onto a database or other data storage, such as, but not limited to, the service request 120 in FIG. 1. The service request in this example is received in a SOAP format compatible with a client computing device that generated the service request, such as the client computing device 112 in FIG. 1.

An authorization and authentication is performed on the service request at operation 604. A determination is made as to whether the service request is valid based on the results of the authorization and authentication at operation 606. If the service request is invalid at operation 606, an error message is sent at operation 608. A determination is then made as to whether a next request is received at operation 618 If no, the process terminates thereafter.

If the service request is valid at 606, the service request is translated into JSON format at operation 610. The translated service request is transmitted to a web services at operation 612. A determination is made as to whether the web services loaded freight data associated with the service request at operation 614. If no, an error message is sent at operation 608. A determination is then made as to whether a next request is received at operation 618 If no, the process terminates thereafter.

If the freight data is loaded at operation 614, an acknowledgement is returned to the client computing device that sent the original service request at operation 616. In some examples, the acknowledge message is transmitted to the client computing device that generated the original service request, such as, but not limited to, the client computing device 112 in FIG. 1.

If a next request is received at operation 618, the process returns to operation 604 to authorize and authenticate the service request 604. Operations 604 through 618 are iteratively executed until no service requests are received at operation 618. The process terminates thereafter.

Figure 7:
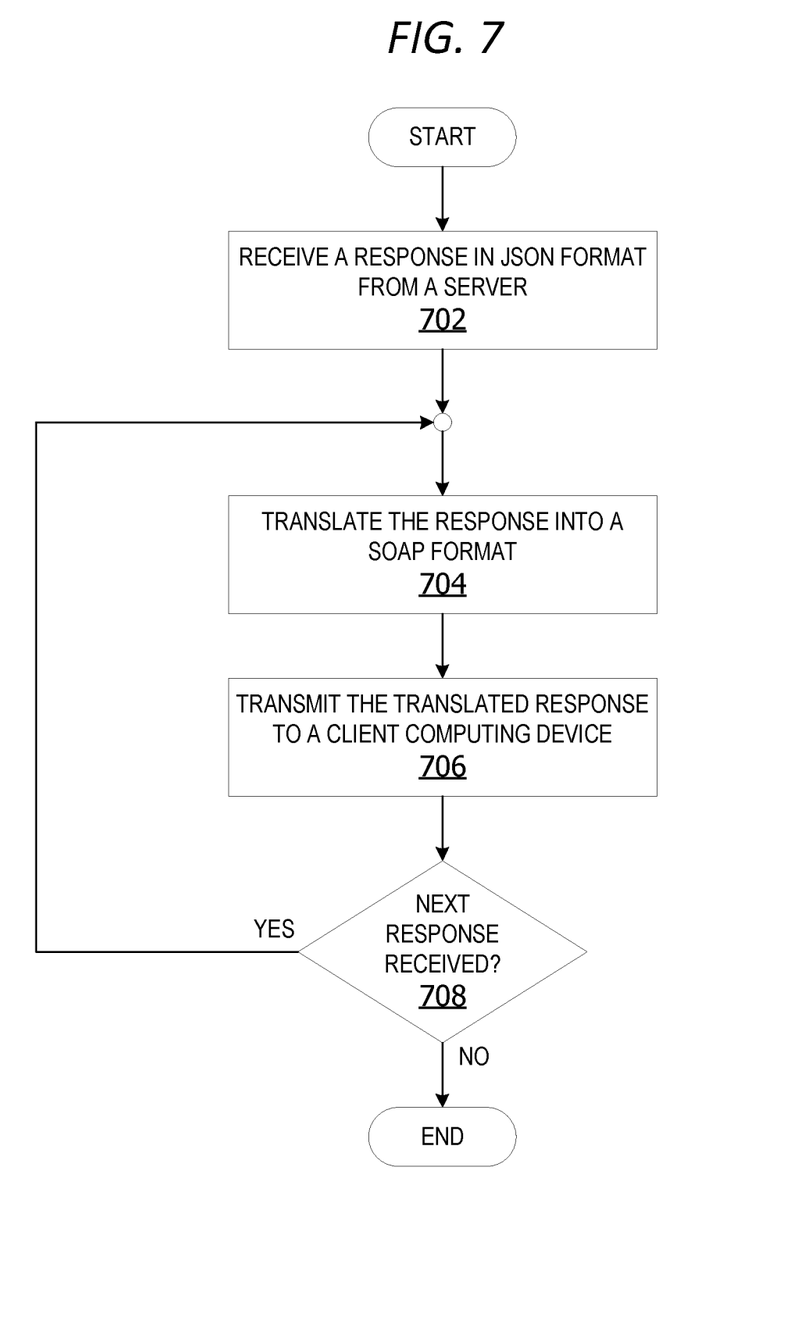
FIG. 7 is an exemplary flow chart illustrating operation of the computing device to translate a service response via a data power component.

FIG. 7 is an exemplary flow chart illustrating operation of the computing device to translate a service response via a data power component. The process shown in FIG. 7 may be performed by a data power component executing on a cloud platform, such as, the cloud server 116 in FIG. 1. In other examples, the data power component is executed on a computing device, such as, but not limited to, the computing device 102, 112, or 114 in FIG. 1.

The process begins by receiving a response in JSON format from a server at operation 702. The response corresponds to an original service request generated by a client computing device, such as, but not limited to, the client computing device 112 or 114 in FIG. 1.

The response is translated into a SOAP format at operation 704. The SOAP format is a format compatible with the client computing device that generated the original service request, such as, but not limited to, the computing device 112 in FIG. 1. The response may include an acknowledge message indicating whether data associated with the original service request has successfully been loaded onto a database or other data storage by a web service, such as, for example, the web service 128 in FIG. 1.

The translated response is transmitted to a client computing device at operation 706. In some examples, the translated response is returned to the client computing device that generated the original service request corresponding to the response.

If a next response is received at operation 708, the process returns to operation 704 to translate the next response into a SOAP format at operation 704. The process iteratively executes operations 704 through 708 until no response is received at operation 708. The process terminates thereafter.

Additional Examples

In some examples, a web service providing data transfer between a client system and a mainframe system is provided. A queue system acknowledges receipt of data via the web service. Service requests are converted to a web service compatible format. The request format is translated from a client side system format into a structure accepted for storage by the mainframe system.

In other examples, the freight management system includes a merchandise returns terms management (MRTM) solution. MRTM manages terms and conditions associated with items received from a vendor or other supplier that is no longer considered a "sellable good," such as, but not limited to, items that are defective, damaged, or overstocked. The freight management system 300 manages contractual terms for returning merchandise that are unsellable (defective, overstocked, or recalled by a vendor or other supplier). After items are delivered and received at a store or other retail location, the freight management system sends the freight payment data received from client computing devices associated with one or more stores or other retail locations to a mainframe computing device via a JAVA web service that loads the freight payment data in a DB2 database table. The JAVA web service processes confirmation details received from the mainframe computing device to the one or more client computing devices. The confirmation details are returned in a response to the client device indicating whether the web service successfully loaded the freight data onto the database.

In still other examples, the JCICS web service is created using Eclipse. Eclipse may be integrated with transaction definition, uniform resource identifier (URI) map definition, and freight payments web service project. The CICS is setup in Eclipse. Eclipse may be provided with CICS plugins to obtain options for creating and integrating definitions into a CICS bundle. The system optionally includes a CICS Explorer system management tools for managing the JCICS web service.

An Apache Tomcat Server in some examples is utilized to test the web services-based data transfer system in a local environment. The web service uniform resource locators (URLs) may be tested using SOAP UI. Once JCICS web service development and testing is completed, the JCICS service is sent to the mainframe for deployment in the CICS region.

In other examples, the data-transfer system is fully blockchain compliant. The system permits any errors or issues to be immediately detected and resolved. The system provides improved data delivery and data recovery reliability. The system further enables real-time exchange of information from the retail locations to home office systems of record.

The client computing device generating the web service request in some examples includes a client web service. The client web service in these examples is a static C library that is invoked to receive freight data, such as freight payment details, in the service request. The client web service conveys the details in the request to the JCICS web service and passes the response from the JCICS web service to the client computing device.

Alternatively, or in addition to the other examples described herein, examples include any combination of the following:

receive a JSON format response from the web service;
convert the JSON format response into a SOAP format response, by the data power component;
transmit the SOAP format response to the first computing device via the network;
perform authorization and authentication of the freight management service request via the data power component;
load the freight data onto the at least one database by the web service;
send an acknowledge message to the first computing device;
wherein the freight data includes at least one of freight payment data or warehouse return data;
loading the freight data onto the at least one database via a row-by-row insertion, using a load freight data operation executed by the second computing device;
wherein the service request is written in an extensible markup language (XML) and the translated service request is written in a JAVA programming language;
a memory device storing a data power component and computer-executable instructions;
receive a freight management service request in a first format from a client computing device, the freight management service request comprising freight data to be loaded onto a set of databases associated with a mainframe computing device;

translate, by a data power component, the freight management service request from the first format into a second format compatible with a REST web service associated with a JCICS region of the mainframe computing device;

the translated freight management service request comprising data structured for storage within the set of databases;

transmit the translated freight management service request to the mainframe computing device;

receive a response message from the mainframe indicating whether loading of the freight data is complete;

wherein the first format is a SOAP format and wherein the second format is a JSON format;

perform an authorization and authentication operation on the service request, by the data power component;

return an error message to a user interface associated with the client computing device in response to a failure to authenticate and authorize the service request;

translate the service request in response to authentication and authorization of the service request;

receive the response message in the second format;

translate the response from the second format into the first format, by the data power component;

transmit the translated response message to the client computing device;

extract freight payment data from the freight data within the translated service request;

load the extracted freight payment data onto a freight payment table within the set of databases;

extract warehouse return data from the freight data within the translated service request;

load the extracted warehouse return data onto a warehouse return confirmation table within the set of databases;

wherein the data power component is executing on a virtual server in a cloud;

transmit the translated freight management service request to the mainframe computing device via a network;

check a message queue for an acknowledge message;

get the acknowledge message in response to identifying the acknowledge message corresponding to the translated service request;

re-send the translated service request in response to a failure to identify the acknowledge message corresponding to the translated service request within a threshold time;

wherein a first REST web service sends the translated service request to the mainframe computing device and a second REST web service loads the freight data onto the at least one database;

identify freight payment data from the freight data within the translated service request;

update a freight payment table associated with the at least one database using the freight payment data;

identify warehouse return data from the freight data within the translated service request;

update a warehouse returns confirmation table associated with the at least one database using the warehouse return data;

perform an authorization and authentication operation on the service request;

return an error message in response to a failed authentication and authorization of the service request;

authorize translation of the service request in response to a successful authentication and authorization of the service request.

At least a portion of the functionality of the various elements in FIG. 1, FIG. 2, FIG. 3, FIG. 4, and FIG. 5 may be performed by other elements in FIG. 1, FIG. 2, FIG. 3, FIG. 4, and FIG. 5, or an entity (e.g., processor, web service, server, application program, computing device, etc.) not shown in FIG. 1, FIG. 2, FIG. 3, FIG. 4, and FIG. 5.

In some examples, the operations illustrated in FIG. 6 and FIG. 7 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for web services-based data transfers. For example, the elements illustrated in FIG. 1, FIG. 2, FIG. 3, FIG. 4, and FIG. 5, such as when encoded to perform the operations illustrated in FIG. 6 and FIG. 7, constitute exemplary means for receiving a freight management service request in a SOAP format from a first computing device; exemplary means for translating the freight management service request from the SOAP format into a JSON format compatible with a web service associated with a second computing device; and exemplary means for transmitting the translated service request through a customer information control system (CICS) component associated with the second computing device.

In another example, the elements illustrated in FIG. 1, FIG. 2, FIG. 3, FIG. 4, and FIG. 5, such as when encoded to perform the operations illustrated in FIG. 6 and FIG. 7, constitute exemplary means for receiving a service request including freight data in a SOAP format from a client computing device; exemplary means for converting the service request from the SOAP into a JSON format compatible with at least one database on a mainframe computing device; exemplary means for transmitting the translated request to a JCSIS component on the mainframe via a web service; exemplary means for resending the translated request to the mainframe in response to a failure to receive a response within a threshold time; exemplary means for receiving a response; and exemplary means for translating the response from the web service from the JSON format into the SOAP format and return the translated response to the client computing device.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for web services-based data transfers, the computer-implemented method comprising:

receiving a freight management service request in a simple object access protocol (SOAP) format from a first computing device, the freight management service request comprising freight data associated with a set of items;

querying, by a data power component, one or more databases associated with a second computing device for compatibility information, the compatibility information comprising a JAVA script object notation (JSON) format, the JSON format compatible with a representational state transfer (REST) web service associated with a JAVA customer information control system (JCICS) component of the second computing device;

translating the service request from the SOAP format into the JSON format, by the data power component, the translated service request comprising converted freight data structured for storage within at least one database of the one or more databases associated with the second computing device;

transmitting, via a network, the translated service request through the JCICS component associated with the second computing device, the REST web service associated with the second computing device loading the freight data onto the at least one database; and consolidating the freight data using a set of messages on a message queue, the set of messages comprising a set of acknowledge messages and a set of error messages.

2. The computer-implemented method of claim 1, wherein the service request is generated by the first computing device, and further comprising:
receiving a JSON format response from the REST web service;
converting the JSON format response into a SOAP format response, by the data power component; and
transmitting the SOAP format response to the first computing device via the network.

3. The computer-implemented method of claim 1, further comprising:
performing authorization and authentication of the service request via the data power component.

4. The computer-implemented method of claim 1, further comprising:
loading the freight data onto the at least one database by the REST web service; and
sending an acknowledge message to the first computing device.

5. The computer-implemented method of claim 1, wherein the freight data includes at least one of freight payment data or warehouse return data.

6. The computer-implemented method of claim 1, further comprising:
loading the freight data onto the at least one database via a row-by-row insertion, using a load freight data operation executed by the second computing device.

7. The computer-implemented method of claim 1, wherein the service request is written in an extensible markup language (XML) and the translated service request is written in a JAVA programming language.

8. A computing system for web service-based data transfers, the computing system comprising:
a memory device storing a data power component and computer-executable instructions; and
a processor configured to execute the computer-executable instructions to:
receive a freight management service request in a first format from a client computing device, the freight management service request comprising freight data to be loaded onto a set of databases associated with a mainframe computing device;
query, by a data power component, at least one or more databases associated with a second computing device for compatibility information, the compatibility information comprising a second format, the second format compatible with a representational state transfer (REST) web service associated with a JAVA customer information control system (JCICS) region of the mainframe computing device;
translate, by the data power component, the freight management service request from the first format into the second format, the translated freight management service request comprising data structured for storage within the set of databases;
transmit the translated freight management service request to the mainframe computing device;
receive a response message from the mainframe indicating whether loading of the freight data is complete; and
consolidate the freight data using a set of messages on a message queue, the set of messages comprising a set of acknowledge messages and a set of error messages.

9. The computing system of claim 8, wherein the first format is a SOAP format and wherein the second format is a JSON format.

10. The computing system of claim 8, wherein the processor is further configured to execute the computer-executable instructions to:
perform an authorization and authentication operation on the service request, by the data power component;
return an error message to a user interface associated with the client computing device in response to a failure to authenticate and authorize the service request; and
translate the service request in response to authentication and authorization of the service request.

11. The computing system of claim 8, wherein the processor is further configured to execute the computer-executable instructions to:
receive the response message in the second format;
translate the response from the second format into the first format, by the data power component; and
transmit the translated response message to the client computing device.

12. The computing system of claim 8, wherein the processor is further configured to execute the computer-executable instructions to:
extract freight payment data from the freight data within the translated service request; and
load the extracted freight payment data onto a freight payment table within the set of databases.

13. The computing system of claim 8, wherein the processor is further configured to execute the computer-executable instructions to:
extract warehouse return data from the freight data within the translated service request; and
load the extracted warehouse return data onto a warehouse return confirmation table within the set of databases.

14. The computing system of claim 8, wherein the data power component is executing on a virtual server in a cloud, and wherein the processor is further configured to execute the computer-executable instructions to:
transmit the translated freight management service request to the mainframe computing device via a network.

15. One or more computer storage media embodied with computer-executable instructions, the one or more computer storage media comprising:
a data power component that:
receives, upon execution by at least one processor, a service request including freight data in a simple object access protocol (SOAP) format from a client computing device;
queries at least one or more databases associated with a mainframe computing device for compatibility information, the compatibility information comprising a JAVA script object notation (JSON) format, the JSON format compatible with a representational state transfer (REST) web service associated with a JAVA customer information control system (JCICS) component of the mainframe computing device;
translates the service request from the SOAP format into the JSON format;
transmits the translated request to the JCSIS component on the mainframe via the REST web service;
in response to a failure to receive a response within a threshold time, re-sends the translated request to the mainframe;

in response to receiving a response from the REST web service, translates the response from the JSON format into the SOAP format and return the translated response to the client computing device; and consolidates the freight data using a set of messages on a message queue, the set of messages comprising a set of acknowledge messages and a set of error messages.

16. The one or more computer storage media of claim 15, wherein the data power component, upon further execution by the at least one processor, checks the message queue for an acknowledge message;

gets the acknowledge message in response to identifying the acknowledge message corresponding to the translated service request; and re-sends the translated service request in response to a failure to identify the acknowledge message corresponding to the translated service request within a threshold time.

17. The one or more computer storage media of claim 15, wherein a first REST web service sends the translated service request to the mainframe computing device, and wherein a second REST web service loads the freight data onto the at least one database.

18. The one or more computer storage media of claim 15, wherein the data power component, upon further execution by the at least one processor, identifies freight payment data from the freight data within the translated service request; and updates a freight payment table associated with the at least one database using the freight payment data.

19. The one or more computer storage media of claim 15, wherein the data power component, upon further execution by the at least one processor, identifies warehouse return data from the freight data within the translated service request; and updates a warehouse returns confirmation table associated with the at least one database using the warehouse return data.

20. The one or more computer storage media of claim 15, further comprising:

an authorization and authentication component, wherein the authorization and authentication component, upon execution by the at least one processor, performs an authorization and authentication operation on the service request;

returns an error message in response to a failed authentication and authorization of the service request; and authorizes translation of the service request in response to a successful authentication and authorization of the service request.

* * * * *